Patented Jan. 26, 1954

2,667,438

UNITED STATES PATENT OFFICE 2,667,438

SCREWWORM FLY CONTROL

Leo R. Gardner, Berkeley, Calif., assignor to California Spray-Chemical Corporation, Richmond, Calif., a corporation of Delaware No Drawing. Application November 10, 1950,
Serial No. 195,150

3 Claims. (Cl. 167—53.2)

The present invention relates to a novel method of screwworm control, and particularly to a new and improved composition adapted for direct application to animals infested by the maggots of the screwworm fly.

The ravages of the American screwworm fly (*Cochliomyia Americana*) upon domestic and wild animals, in particular, cattle, sheep, and horses, have seriously accentuated the need for an effective control of this pest. The screwworm fly deposits its eggs about the edges of wounds or body openings of the animal, and its maggots initially feed upon the wound and thereafter invade the sound body tissue, thereby enlarging the wound and ultimately resulting in the death of the animal unless treatment is promptly applied.

Prior to the present invention, the treatment of the infested wounds required isolation of the animal, with constant application of medicinal and insecticidal preparations over considerable periods of time. The recognized universal treatment of maggot-infested wounds consisted of application of smear preparations and finely ground diphenylamine crystals. The smear preparations were composed largely of pine tar oil containing a high proportion of aromatic components and, in isolated instances, of petrolatum ointments containing dichlorodiphenyltrichloroethane (DDT). In order to obtain successful treatment, it was required that the animal be under constant observation and the infested wound continuously covered with these smear or salve preparations. The function of this type of treatment was to repel the invasion of the egg-laying screwworm fly and destroy the maggots within the wound. The natural disadvantage attendant to this treatment was the impractical isolation of infested animals for considerable periods of time, as well as continued infection of the wound through retention of the destroyed maggots.

In accordance with the present invention, it has now been found possible to effectively control the maggot infestation of the screwworm fly with a one-shot application without the requirement of isolation and observation of the diseased animal. This exceptional and unexpected method of controlling the destructive forces of the American screwworm fly has been obtained by the discovery of a novel and critically composed insecticidal composition. It has been found that by combining an insecticidally active compound of the class of substituted diphenyl chloroethanes with hexachlorocyclohexane containing at least 50%, and preferably above about 80%, of its gamma isomer in combination with a water-soluble polyethoxyethanol emulsifier and a non-toxic solvent, a composition is obtained which upon direct application to the maggot-infested wound of an animal effectively destroys the existing maggots, prevents further infestation, and assists in the healing of the wound.

In order to obtain maximum effectiveness in all aspects of screwworm control, the various components should be present in the following ranges:

| | Per cent |
|---|---|
| Substituted diphenyl chloroethanes | 5–25 |
| High gamma content hexachlorocyclohexane | 2–10 |
| Polyethoxyethanol emulsifier | 5–15 |
| Non-toxic solvent | 40–70 |

When combined in these ranges of proportions, the components of the subject composition uniquely cooperate in function and effect to obtain an exceptional and practical control of the screwworm fly.

In practice the subject composition is directly applied by swab or by jet application to the infested wound of the animal. The emulsifier and solvent allows rapid penetration through the hair and wool and through the infection and mucous of the wound to positively contact the maggots working in the flesh. The polyethoxyethanol type of emulsifier is effective in distributing the toxicants into the exposed tissue and fluid of the open wound where the maggots occur. The hexachlorocyclohexane component violently irritates the maggots so that they crawl out of the wound and drop to the ground, where they die from the action of the quick-acting hexachlorocyclohexane and/or the substituted diphenyl chloroethane insecticide.

The clearing of the wound is an important facet of the function of the subject composition, since one of the disadvantages of the prior art smear methods is the danger of infection from the dead and rotting maggots. The longer residual insecticidal life of the substituted diphenyl chloroethanes effectively prevents reinfestation of the wound and is reinforced by the shorter term residual action of the hexachlorocyclohexane during the critical initial period after treatment. The non-toxic solvent, which may consist of a terpene solvent such as pine oil and/or an aromatic solvent and particularly the alkyl aromatic solvents, assist in the penetration of the wound and its surrounding area while in addition imparting a disinfectant action. The fairly rapid evaporation rate of the alkyl aromatic solvent balances the degree of penetration into the surrounding flesh of the animal with a residual healing action of the cleansed wound. This explanation of the function of the subject composition is predicated upon controlled observations, but is not a limitation on the net effect or use of the composition.

The substituted diphenyl chloroethane component of the composition may be any of the active insecticides falling within this structural category and which are conventionally represented by p,p'-dichlorodiphenyltrichloroethane (DDT) and its functional equivalents. Although DDT is the preferred illustration of this component, other insecticides such as dianisyltrichloroethane (Methoxychlor), dichlorodiphenyldichloroethane (DDD), and ditolyltrichloroethane (DTT), as well as other insecticidally active substituted diphenyl chloroethanes which are not acutely toxic to warm-blooded animals at the formula concentrations, may be employed. In general, the substituents of the phenyl rings may be in the ortho, meta, or para positions, as well as mixtures thereof. As previously mentioned, this component is employed in the composition within the range of about 5 to 25% by weight, which is variable in accordance with the specific insecticide used and its functional balance with the other components of the composition.

The hexachlorocyclohexane component should contain as high a content of the gamma isomer as is practically feasible, both from the standpoint of effective insecticidal value and its animal toxicity factor. A gamma isomer content greater than 50% and preferably greater than about 80% is desirable to avoid any deleterious effects to the animal from this component.

For optimum effect and maximum killing action, a substantially pure gamma isomer of at least 99.5% purity (Lindane) is preferred. This component is desirably present in the composition in a weight range of from about 2 to 10%, which may be varied within this range or even increased in accordance with the gamma isomer content of the hexachlorocyclohexane. When employing the purified gamma isomer or Lindane, amounts ranging from about 2 to 7% have been found sufficient to provide the desired irritating effect and quick-kill action to be effective.

The polyethoxyethanol type of emulsifying agent is utilized for its unique properties for the present application. Thus, the water-soluble polyethoxyethanols not only provide the desired type of emulsification with the mucous and water matter of the wound, but also allow penetration into the adjoining tissue by virtue of its flesh-emulsifying characteristics. Additionally, these compounds possess excellent wetting power and a mild disinfecting action.

The polyethoxyethanols which may be used are generally the reaction products of ethylene oxide and high molecular weight alcohols, acids, and alkylphenols. The balance between the polyethoxyethanol chain and the reaction substituent must be such that a final reaction product is primarily water-soluble. As a particular illustration of this type of water-soluble emulsifying agent may be mentioned the alkylphenoxy polyethoxyethanols, and specifically octylphenoxy polyethoxyethanol. For effective emulsification and optimum utilization of the residual properties of the polyethoxyethanol emulsifier, this component should be present in amounts ranging from about 5 to 15% by weight; and when utilizing a water-soluble alkylphenoxy polyethoxyethanol, it is preferred to utilize amounts ranging from 7 to 12%.

The choice of solvents is restricted by solubility requirements and animal toxicity factor to the terpene or pine oil solvents and the alkyl aromatic hydrocarbon type of solvent. The alkyl aromatic solvents such as toluene, ethylbenzene, xylenes, isopropylbenzene, etc. are suitable solvents for the insecticidal components and are non-toxic to warm-blooded animals. Additionally, they impart an added spreading action and a balanced evaporation rate. The aromatic petroleum fractions, and particularly the technical xylene solvents, normally contain constituents which are beneficial in assisting the healing of the wound. The proportion of the alkyl aromatic solvent in the composition is not deemed critical, but for balanced composition it is desirable to incorporate the solvent within the range of about 40-70% by weight.

The following composition is presented as one illustration of the formulation of the subject compositions employing the preferred specific components and proportions. It is to be understood that this composition is given by way of illustration and is not intended as a limitation to the compositions of the invention.

| | Per cent by weight |
|---|---|
| p,p'-Dichlorodiphenyltrichloroethane | 26.0 |
| Lindane (99.5% gamma isomer) | 4.5 |
| Octylphenyl polyethoxyethanol | 10.0 |
| Technical xylene | 59.5 |

Although these compositions are applied directly without further dilution, various minor ingredients may be incorporated for matters of practical application. As an illustration, in certain instances a dye is incorporated which colors the area around the wound which has been treated in order to avoid duplication and to assist in observation.

Obviously, many modifications and variations of the invention as hereinabove set forth may be made without departing from the spirit and scope thereof, and only such limitations should be imposed as are indicated in the appended claims.

I claim:

1. An insecticidal composition suitable for the control of the American screwworm fly comprising about 5-25% by weight of p,p'-dichlorodiphenyltrichloroethane, about 2-10% by weight of hexachlorocyclohexane containing at least 50% of its gamma isomer, about 5-15% by weight of a water-soluble alkylphenoxy polyethoxyethanol emulsifying agent, and about 40-70% of a predominantly alkyl aromatic hydrocarbon solvent.

2. The composition of claim 1, wherein the alkyl aromatic hydrocarbon solvent is a xylene solvent.

3. An insecticidal composition suitable for the control of the American screwworm fly comprising about 5-25% by weight of p,p'-dichlorodiphenyltrichloroethane, about 2-10% by weight of Lindane, about 5-15% by weight of a water-soluble alkylphenoxy polyethoxyethanol emulsifying agent, and about 40-70% by weight of a xylene solvent.

LEO R. GARDNER.

(References on following page)

UNITED STATES PATENTS

| Number | Name | Date |
|---|---|---|
| 2,504,207 | Littler | Apr. 18, 1950 |

OTHER REFERENCES

Jones, Journal of Economic Entomology, vol. 39, December 1946, pages 737 to 740.

Journal of Economic Entomology, vol. 38, December 1945, pages 662 to 667.

Gaines, Journal of Economic Entomology, vol. 41, August 1948, pages 548 to 554.

Journal of Economic Entomology, vol. 41, August 1948, page 665.

Soap and Sanitary Chemicals, July 1947, page 129.

Dove, U. S. Dept. of Agriculture, Summary of DDT Experiments on Insects that Affect Man and Animals, E-673, October 1945, page 9.

Washington Post, December 24, 1951, page 5B.

Van Winkle, Drug Research and Development (1948), pages 361, 362, 377.